United States Patent
Abel et al.

(10) Patent No.: US 9,891,112 B1
(45) Date of Patent: Feb. 13, 2018

(54) RADIATION DETECTOR

(71) Applicant: International Business Machines Corporation, Armonk, NY (US)

(72) Inventors: Stefan Abel, Zurich (CH); Lukas Czornomaz, Zurich (CH); Jean Fompeyrine, Waedenswil (CH); Bernd w. Gotsmann, Horgen (CH); Fabian Menges, Urdorf (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/297,777

(22) Filed: Oct. 19, 2016

(51) Int. Cl.
*G01J 1/42* (2006.01)
*G01J 5/08* (2006.01)
*G01J 5/10* (2006.01)

(52) U.S. Cl.
CPC .......... *G01J 5/0853* (2013.01); *G01J 5/0818* (2013.01); *G01J 5/10* (2013.01)

(58) Field of Classification Search
CPC ...... G01J 5/025; G01J 5/10; G01J 3/28; G01J 3/108; G01J 3/42; G01J 5/02; G01J 3/10; G01J 3/0218; G01J 3/0224; G01N 27/16; G01N 33/0075; G02F 1/335; G02F 1/365; G21K 5/02
See application file for complete search history.

(56) References Cited

U.S. PATENT DOCUMENTS

| | | |
|---|---|---|
| 8,655,189 B2 | 2/2014 | Almassy et al. |
| 9,217,673 B2 | 12/2015 | Corcos et al. |
| 9,261,408 B2 | 2/2016 | Zaitsev |
| 2012/0223804 A1 | 9/2012 | Gaitas |

(Continued)

FOREIGN PATENT DOCUMENTS

| | | |
|---|---|---|
| WO | WO 02/099896 A1 | 12/2002 |
| WO | WO 2016/005505 A2 | 1/2016 |

OTHER PUBLICATIONS

Ann-Katrin et al., "Uisng low-los phase-change materials for mid-infrared antenna resonance tuning," 2013, Nano Letters, vol. 13, pp. 3470-3475.*
Jerominek et al., "Vanadium oxide films for optical switching and detection," Sep. 1993, Otpical Engineering, vol. 32, No. 9, pp. 2092-2099.*
Liu et al., "Electron-Phonon Coupling on the NbSi Transition Edge Sensors" Lab CSNSM, Bat108 Universite de Paris-Sud XI, Orsay 91405, France, dated Feb. 18, 2014, pp. 1-24.

(Continued)

*Primary Examiner* — Kiho Kim
(74) *Attorney, Agent, or Firm* — Scully, Scott, Murphy & Presser, P.C.; Daniel P. Morris, Esq.

(57) ABSTRACT

A radiation detector and method and computer program product for detecting radiation. The detector comprises a waveguide structure, a sensing structure comprising a phase change material, an optical transmitter and optical receiver. The optical transmitter transmits an optical sensing signal for receipt at the optical receiver via the waveguide structure. The phase change material comprises a first phase state at a first temperature range and a second phase state at a second temperature range and transitions from the first phase state to the second phase state under exposure of the radiation. The sensing structure is arranged in an evanescent field area of the waveguide structure and provides for an evanescent field of the optical sensing signal a first complex refractive index in the first phase state and a second complex refractive index in the second phase state. The first complex refractive index is different from the second complex refractive index.

20 Claims, 5 Drawing Sheets

(56) References Cited

U.S. PATENT DOCUMENTS

| | | | |
|---|---|---|---|
| 2015/0136987 A1* | 5/2015 | Kajiki | G02F 1/353 |
| | | | 250/339.07 |
| 2015/0285687 A1 | 10/2015 | Hwang et al. | |
| 2016/0018267 A1 | 1/2016 | Timofeev et al. | |

* cited by examiner

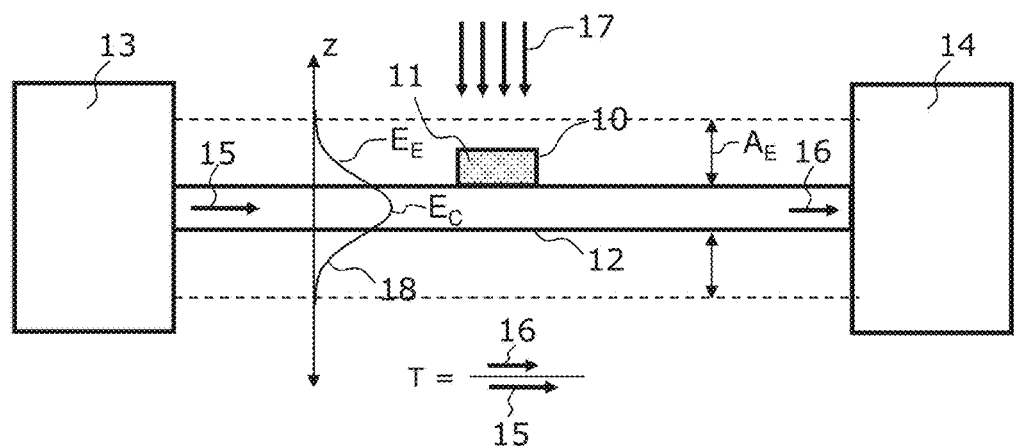
FIG. 1       100
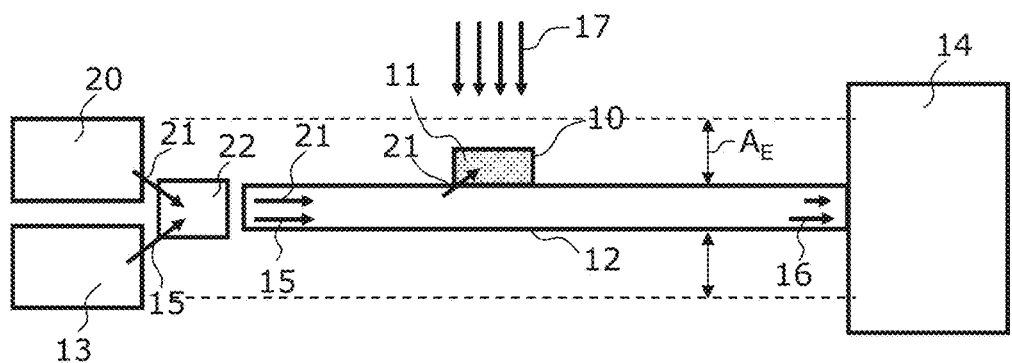
                                           200
FIG. 2

RADIATION DETECTOR

BACKGROUND

The present disclosure relates generally to a radiation detector for detecting radiation, in particular radiation in the Tera Hertz (THz) and infrared (IR) range. Such a radiation detector may also be denoted as bolometer. The invention also relates to a corresponding method and a corresponding computer program product.

Detection of Tera Hertz and infrared radiation requires highly sensitive radiation detectors. Today, most IR and THz radiation detectors are MEMS based structures comprising an electrical readout.

WO 02/099896 A2 Dec. 12, 2002 H01L 31/09 discloses an infrared radiation imager. An infrared image signal can be read out optically and in a parallel fashion using a sensor which includes an optical resonator structure with a thin layer of $VO_2$ on a mirror layer disposed at a focal plane of IR optics projecting the image.

Accordingly, there is a need for other radiation detectors.

SUMMARY

According to a first aspect, there is provided a radiation detector for detecting radiation. The radiation detector comprises a waveguide structure, a sensing structure comprising a phase change material, an optical transmitter and an optical receiver. The optical transmitter is configured to transmit an optical sensing signal to the optical receiver and the optical receiver is configured to receive the optical sensing signal from the transmitter via the waveguide structure. The phase change material comprises as phase states a first phase state at a first temperature range and a second phase state at a second temperature range. The phase change material is configured to transition from the first phase state to the second phase state under exposure of the radiation. The sensing structure is arranged in an evanescent field area of the waveguide structure. The sensing structure is configured to provide for an evanescent field of the optical sensing signal a first complex refractive index in the first phase state of the phase change material and a second complex refractive index in the second phase state of the phase-state material. The first complex refractive index is different from the second complex refractive index.

The complex refractive index comprises a real part and an imaginary part. According to embodiments, the real part, the imaginary part or both the real part and the imaginary part of the phase change material may change under exposure of the radiation. According to embodiments, the change of the real part and/or the change of the imaginary part can be used for detection of the radiation.

The real part of the complex refractive index corresponds to the refractive index and the imaginary part corresponds to the absorption coefficient of the phase change material. The absorption coefficient may be also denoted as extinction coefficient.

The sensing of such a radiation detector having an optical transmitter and an optical receiver may work fully in the optical domain. This facilitates an efficient thermal isolation of the sensing structure and a fast response time. Furthermore, it facilitates detector embodiments with high sensitivities.

According to a preferred embodiment the radiation detector is configured to measure a transmission of the waveguide structure for the sensing signal and to derive the phase state of the phase change material in dependence on the transmission of the waveguide structure for the sensing signal.

According to such an embodiment, the respective phase state of the phase change material influences the transmission of the optical sensing signal. Hence the measured transmission can be used to detect any incident radiation on the sensing structure that changes the phase of the phase change material.

According to another preferred embodiment the first phase state is a state with a first electrical resistivity and the second phase state is a state with a second electrical resistivity, wherein the first electrical resistivity is greater than the second electrical resistivity. The first phase state may be e.g. insulating or semi-insulating and the second phase state may be metallic.

According to such an embodiment metal-insulator transition (MIT) materials may be used as phase change materials. Such materials provide a high temperature sensitivity and are hence particularly suited for radiation detectors.

According to a preferred embodiment of such a metal-insulator material, the phase change material is a correlated oxide, in particular vanadium dioxide ($VO_2$). The transition temperature between the first (insulating) phase state and the second (metallic) phase state of $VO_2$ is approximately in a range between 65° C. and 75° C., which makes $VO_2$ a preferred choice for radiation detectors according to the embodiments. At room temperature, $VO_2$ is still well below the transition temperature and hence in the insulating state. And with some heating, $VO_2$ can easily and efficiently be brought close to the transition temperature to the metallic state.

Other preferred material choices for the phase change material are $V_4O_7$, $V_6O_{11}$, $V_2O_3$, $V_6O_{13}$, $V_5O_9$, VO, $V_8O_{15}$, $NbO_2$, $Ti_2O_3$, $LaCoO_3$, $Ti_3O_5$, $SmNiO_3$, $NdNiO_3$, $PrNiO_3$, $Fe_3O_4$, $Ge_2Sb_2Te_5$ and related Ge—Sb—Te alloys.

According to another preferred embodiment, the sensing structure comprises an absorber to increase the absorption of the radiation by the sensing structure.

This may further increase the sensitivity of the radiation detector, in particular for frequency ranges of the radiation that are not so well absorbed by the phase change material itself.

According to another preferred embodiment, the radiation detector comprises a heating device configured to apply an optical heating signal via the waveguide structure to the sensing structure.

With such a heating device, the sensing structure can be heated close to the transition temperature of the respective phase change material. This facilitates an efficient operation of the device close to the transition temperature and hence an efficient detection of radiation. A control circuit may be applied to ensure that the temperature of the sensing structure is kept at a value or value range for optimum sensitivity towards the radiation which is to be detected.

According to another preferred embodiment, a heating wavelength of the heating signal is different from a sensing wavelength of the sensing signal.

According to such an embodiment, the sensing is done at a different wavelength than the heating. This separates sensing and heating and allows choosing the sensing frequency such that not too much energy is coupled into the phase change material during sensing.

According to another preferred embodiment, the sensing structure is arranged on a suspended structure that provides a vacuum gap between the sensing structure and the waveguide structure.

This facilitates a good thermal insulation of the sensing structure which results in an increased sensitivity to incident radiation.

According to another preferred embodiment, the detector is configured to apply the heating signal to the sensing structure via a near field coupling between the waveguide structure and the sensing structure.

This facilitates an efficient heating of the sensing structure. The heating may be performed with photons at a specific energy where a resonant thermal coupling effect between the waveguide structure and the phase change material, in particular the MIT material, can be exploited.

According to another preferred embodiment the sensing structure is directly arranged on the waveguide structure. This facilitates an efficient thermal transfer of the heating signal.

According to another preferred embodiment the waveguide structure comprises an optical resonator comprising a plurality of holes.

The holes establish an optical cavity and may improve the optical sensitivity. Furthermore, the holes provide a thermal decoupling.

According to another preferred embodiment the detector comprises a plurality of sensing structures, the plurality of sensing structures comprising different phase change materials having different transition temperatures.

According to such an embodiment, the detector can be designed such that one of the plurality of sensing structures is always close to the transition temperature of the respective phase change material and hence operable to sensitively detect radiation. An embodiment with multiple sensing structures tuned with phase change materials at different wavelengths may need no or reduced active heating of the respective phase change materials. The operable temperature range of such an embodied device may thus be increased.

According to another embodiment, each of the plurality of sensing structures comprises a resonator structure that is optically coupled to the phase change material of the respective sensing structure, wherein the resonator structures of the plurality of sensing structures have a different resonance wavelength. According to an embodiment the transmitter is configured to transmit a plurality of sensing signals, wherein the plurality of sensing signals has a different sensing wavelength adapted to sense a phase state transition of one of the plurality of sensing structures.

This allows a separate read out of the plurality of sensing structures. The resonators structures may be e.g. connected with posts to the waveguide structure or an underlying wafer.

According to another embodiment, the transmitter may emit broadband light and the receiver may determine the spectrum of the transmitted light.

According to another preferred embodiment the phase change material is strained to tune the phase transition characteristics of the phase change material.

According to another preferred embodiment the phase change material is doped to tune the phase change characteristics of the phase change material.

According to another preferred embodiment, the phase change material may have different oxidation states to tune the phase change characteristics of the phase change material.

According to another preferred embodiment the detector is configured to detect the radiation in the THZ and/or the IR range.

According to another embodiment a sensor network is provided comprising a plurality of radiation detectors as embodied above.

According to another aspect, a method for detecting radiation by a radiation detector is provided. The radiation detector comprises a waveguide structure and a sensing structure comprising a phase change material. The phase change material has a first phase state at a first temperature range and a second phase state at a second temperature range. The sensing structure is arranged in an evanescent field area of the waveguide structure. The method comprises transmitting, by an optical transmitter, an optical sensing signal via the waveguide structure to an optical receiver and providing, by the phase change material, to the evanescent field of the optical sensing signal a first complex refractive index in the first phase state and a second complex refractive index in the second phase state. The first complex refractive index is different from the second complex refractive index. The method further comprises receiving, by the optical receiver, the optical sensing signal from the transmitter and measuring a transmission of the waveguide structure for the sensing signal. A further step includes deriving the phase state of the phase change material in dependence on the transmission of the waveguide structure for the sensing signal.

According to another aspect a computer program product for operating a radiation detector according to the first aspect is provided. The computer program product comprises a computer readable storage medium having program instructions embodied therewith. The program instructions are executable by the radiation detector to perform a method comprising transmitting, by an optical transmitter, an optical sensing signal via the waveguide structure to an optical receiver and providing, by the phase change material, to the evanescent field of the optical sensing signal a first complex refractive index in the first phase state and a second complex refractive index in the second phase state. The first complex refractive index is different from the second complex refractive index. The method further comprises receiving, by the optical receiver, the optical sensing signal from the transmitter and measuring a transmission of the waveguide structure for the sensing signal. A further step comprises deriving the phase state of the phase change material in dependence on the transmission of the waveguide structure for the sensing signal.

Embodiments will be described in more detail below, by way of illustrative and non-limiting examples, with reference to the accompanying drawings.

BRIEF DESCRIPTION OF THE SEVERAL VIEWS OF THE DRAWINGS

FIG. 1 shows a schematic illustration of a radiation detector according to an embodiment;

FIG. 2 shows a schematic illustration of a radiation detector according to another embodiment;

FIG. 3b shows a corresponding side view of the radiation detector of FIG. 3a;

FIG. 4b shows a corresponding side view of the radiation detector of FIG. 4a;

DETAILED DESCRIPTION

Figure 3A:
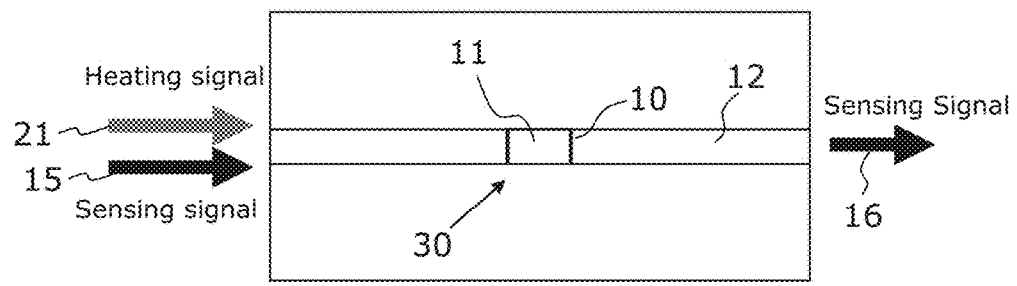
FIG. 3a shows a top view of a radiation detector according to another embodiment.

FIG. 1 shows a schematic illustration of a radiation detector 100 according to an embodiment. The radiation detector 100 comprises a sensing structure 10 comprising a phase change material 11. The radiation detector 100 further comprises a waveguide structure 12 for guiding optical signals. The radiation detector 100 further comprises an optical transmitter 13 and an optical receiver 14. The optical transmitter 13 is configured to generate an optical sensing signal 15 and to transmit this optical sensing signal 15 via the waveguide structure 12 to the optical receiver 14. The optical receiver 14 is configured to receive an optical sensing signal 16 from the transmitter 13 via the waveguide structure 12. The received optical sensing signal 16 corresponds to the initially transmitted optical sensing signal 15 after the transmission via the waveguide structure 12. In particular, the received optical sensing signal 16 may have faced some absorption by the sensing structure 10. This is illustrated by a shorter length of the arrow that indicates the sensing signal 16 as compared to the arrow of the initially transmitted sensing signal 15. The radiation detector 100 can detect radiation 17 that is applied to the sensing structure 10. The radiation 17 may be in particular THz or IR-radiation.

The phase change material 11 of the sensing structure 10 comprises a first phase state at a first temperature range and a second phase state at a second temperature range. Accordingly, the respective phase of the phase change material is dependent on the temperature of the phase change material. If the phase change material 11 is exposed to the radiation 17, it will heat up and change its temperature due to the incident radiation 17. According to embodiments the radiation detector 100 is operated close to the transition temperature between the first phase state and the second phase state. More particularly, the temperature of the phase change material 11 is preferably controlled in such a way that the phase change material 11 is slightly below the transition temperature from the first phase state to the second phase state if no radiation 17 is applied to the sensing structure 10. If then a radiation 17 is applied to the sensing structure 10, the phase change material 11 is heated by the radiation 17 and the temperature of the phase change material 11 will exceed the transition temperature from the first phase state to the second phase state. Hence, if the sensing structure 10 is exposed to an incident radiation 17, the phase change material 11 will transition from the first phase state to the second phase state under exposure of the radiation 17. The first phase state and the second phase state of the phase change material 11 have different material properties. In particular, the first phase state and the second phase state provide different complex refractive indices for incident optical sensing signals 15.

The sensing structure 10 is arranged in an evanescent field area $A_E$ of the waveguide structure 12. The evanescent field area $A_E$ is an area outside the waveguide structure 12 which carries an evanescent field $E_E$ of the optical sensing signal 15. Inside the waveguide structure 12 the optical sensing signal has a core field $E_C$. The strength of the core field $E_C$ is greater than the strength of the evanescent field $E_E$. The strength of the evanescent field $E_E$ decreases exponentially in a z-direction orthogonally to the surface of the waveguide structure 12. This is illustrated by an exemplary plot 18 of the field strength of the sensing signal 15.

The sensing structure 10 provides for the evanescent field $E_E$ of the optical sensing signal 15 a first complex refractive index in the first phase state of the phase change material 11 and a second complex refractive index in the second phase state of the phase-state material 11. The first complex refractive index and the second complex refractive index are different from each other. Hence the optical sensing signal 15 that travels from the optical transmitter 13 to the optical receiver 14 exhibits a different transmission behavior in dependence on the respective phase state of the phase change material 11. And as the phase state is an indicator whether the sensing structure 10 is exposed to an incident radiation 17, the transmission experienced by the optical sensing signal 15 can be used to detect whether a radiation 17 is falling on the sensing structure 10 or not. More particularly, the radiation detector 100 measures a transmission of the waveguide structure 12 for the sensing signal 15. Measuring the transmission may in particular encompass measuring a transmission coefficient T. The transmission coefficient T indicates how much of the optical sensing signal 15 that is transmitted by the optical transmitter 13 passes through the waveguide structure 12 and reaches the optical receiver 14 as optical sensing signal 16. The transmission coefficients may be determined for the amplitude or the intensity of the optical sensing signal. In both cases the transmission coefficient T may be calculated by taking the ratio of the respective value (amplitude or intensity) at the optical receiver 14 to the value at the optical transmitter 13. As mentioned above, the optical sensing signal at the side of the optical transmitter 13 is denoted as optical sensing signal 15 and the optical sensing signal at the side of the optical receiver 14 is denoted as optical sensing signal 16. Accordingly, the transmission coefficient T may be calculated by the ratio of the power or amplitude of the optical sensing signal 16 to the power or amplitude of the optical sensing signal 15 as also illustrated in FIG. 1. The optical sensing signal 15, 16 may be in particular an electro-magnetic wave oscillating at frequencies at or close to the visible spectrum or at an infrared spectrum. In the above context, the term amplitude may refer in particular to the magnitude of the electric field and the term power may corresponds in particular to the magnitude of the Poynting vector (E×H).

The radiation detector 100 can then derive the phase state of the phase change material 11 from the measured transmission/transmission coefficient of the sensing signals 15, 16.

The first phase state may be in particular a metallic state and the second phase state an insulating state. According to a preferred embodiment of such a metal-insulator material, the phase change material is a correlated oxide, in particular vanadium dioxide ($VO_2$). The transition temperature between the insulating phase state and the metallic phase state of $VO_2$ is approximately in a range between 65° C. and 75° C. and can be adapted e.g. by doping, by applying strain, or by adjusting the oxidation state of the vanadium. The radiation detector 100 is operated in such a way that without incident radiation 17, the metal-insulator material is below the transition temperature and hence in the insulating state. Upon incident radiation 17 and the associated heating of the metal-insulator material, the metal-insulator material is brought above the transition temperature and thereby the metal-insulator material transitions to the metallic state.

In the metallic state, the phase change material 11 of the sensing structure 10 provides a higher absorption coefficient to the evanescent field $E_E$ of the optical sensing signal 15 than in the insulating state. As a result, the measured transmission T of the optical sensing signal 15, 16 decreases when the phase change material 11 transitions from the insulating state to the metallic state. This decreasing transmission T indicates that the phase change material 11 is exposed to an incident radiation 17.

FIG. 2 shows a schematic illustration of a radiation detector 200 according to another embodiment. The radiation detector 200 comprises a waveguide structure 12, a sensing structure 10, an optical transmitter 13 and an optical receiver 14 as explained with reference to FIG. 1. In addition, the radiation detector 200 comprises a heating device 20 configured to apply an optical heating signal 21 via the waveguide structure 12 to the sensing structure 10. The optical heating signal 21 is adapted to heat the sensing structure 10 close to the transition temperature of the phase change material 11 from the first phase state, e.g. the insulating state of an MIT-material, to the second phase state, e.g. the metallic state of an MIT-material. The heating device 20 and the optical transmitter 13 may be e.g. integrated on one single device. A coupler structure 22 is provided between the waveguide structure 12, the optical transmitter 13 and the heating device 20 in order to couple the heating signal 21 and the sensing signal 15 into the waveguide structure 12.

The heating signal 21 has a wavelength that is different from the wavelength of the sensing signal 15. The wavelength of the heating signal 21 is denoted as heating wavelength and the wavelength of the sensing signal is denoted as sensing wavelength.

Performing the sensing at a different wavelength than the heating allows using a wavelength that is optimal for the respective task of sensing or heating.

Figure 3B:
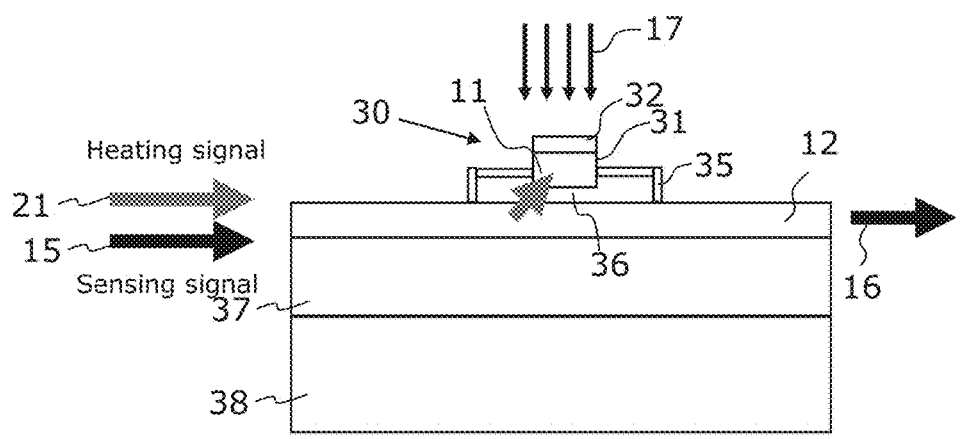

FIG. 3a shows a top view of a radiation detector 300 according to another embodiment. FIG. 3b shows a corresponding side view of the radiation detector 300.

The radiation detector 300 comprises a waveguide structure 12 as described with reference to FIG. 1. The waveguide structure 12 receives an optical sensing signal 15 from an optical transmitter, e.g. from the optical transmitter 13 as described with reference to FIG. 1. Furthermore, the waveguide structure 12 receives an optical heating signal 21 from a heating device, e.g. the heating device 20 as described with reference to FIG. 2. For ease of illustration, FIGS. 3a and 3b do not show the heating device, the transmitter and the receiver.

The radiation detector 300 comprises a sensing structure 30 that comprises a layer 31 of a phase change material 11 and an absorber 32, which is also formed as a layer and arranged on top of the layer 31 of the phase change material. The absorber 32 increases the absorption of the radiation 17 by the sensing structure 30. The increased absorption results in an increased temperature change of the phase change material 11 and hence and increased sensitivity of the radiation detector 300.

The sensing structure 30 is arranged or fixed respectively on a support structure 35. Accordingly, a vacuum gap 36 is provided between the sensing structure 30 and the waveguide structure 12. The vacuum gap 36 provides a good thermal insulation between the sensing structure 30 and the waveguide structure 12. The waveguide structure 12 is arranged on an insulating layer 37 and the insulating layer 37 is arranged on a substrate 38. The substrate 38 may be e.g. a Si-substrate of a Si-wafer, the insulating layer 37 may be e.g. a layer of $SiO_2$ and the waveguide structure 12 may be e.g. a Si-waveguide.

The radiation detector 300 applies the heating signal 21 to the sensing structure 30 via a near field coupling, in particular an enhanced near field coupling, between the waveguide structure 12 and the sensing structure 30. More particularly, the waveguide structure 12 is used to pump optical energy into the phase change material 11 in order to heat it up close to the transition temperature. The heating is performed with photons at a specific energy that is different from the readout energy. More particularly, the enhanced near field coupling can be reached by a resonant thermal coupling effect between the waveguide structure 12 and the phase change material 11. Such a resonant thermal coupling may be in particular achieved with MIT materials as phase change materials such as VO2. For a close proximity of two materials, e.g. $VO_2$ and $SiO_2$, a phonon polariton interaction results in an enhanced energy transfer in the near field. A typical resonance wavelength for such an enhanced energy transfer is between 10 µm and 30 µm. In order to increase the near field coupling, the waveguide structure 12 may be e.g. covered with a thin layer of $SiO_2$, having a thickness of. e.g. 200 nm.

The radiation detector 300 uses also different wavelengths for the sensing signal 15 and the heating signal 21. A first wavelength $\lambda_1$ is used for energy transfer into the MIT material in order to heat the MIT material to keep it close to the transition temperature by utilization of near-field enhanced coupling. A second wavelength $\lambda_2$ is used for sensing. Depending on the state of the MIT material, the sensing signal experiences a different absorption and the measurement of the transmission of the sensing signal 15 can be linked to the respective phase state of the MIT material and the respective temperature of the MIT material.

Figure 4A:
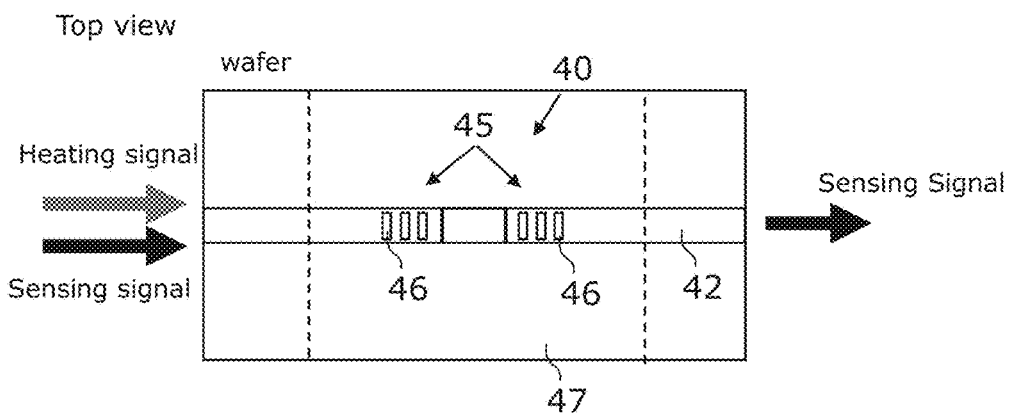
FIG. 4a shows a top view of a radiation detector according to another embodiment.
Figure 4B:
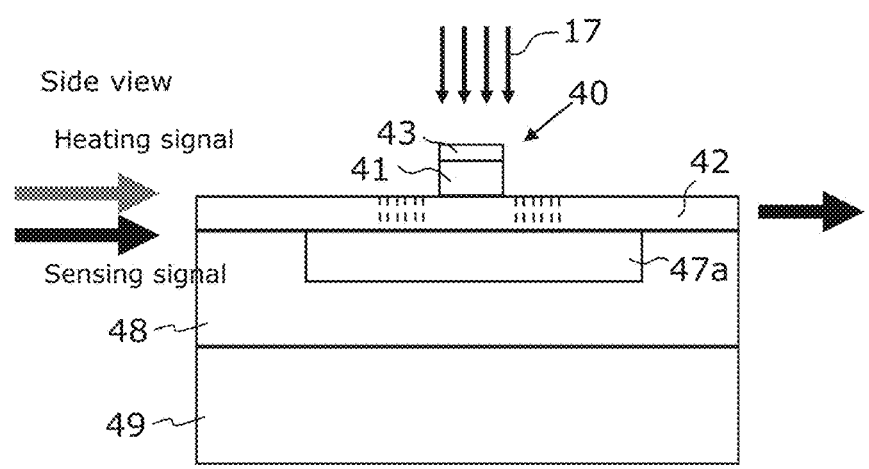

FIG. 4a shows a top view of a radiation detector 400 according to another embodiment. FIG. 4b shows a corresponding side view of the radiation detector 400.

The radiation detector 400 comprises a waveguide structure 42. The waveguide structure 42 receives an optical sensing signal 15 from an optical transmitter, e.g. from the optical transmitter 13 as described with reference to FIG. 1. Furthermore, the waveguide structure 42 receives an optical heating signal 21 from a heating device, e.g. the heating device 20 as described with reference to FIG. 2. For ease of illustration, FIGS. 4a and 4b do not show the heating device, the transmitter and the receiver.

The radiation detector 400 comprises a sensing structure 40 that comprises a layer 41 of a phase change material 11 and an absorber 43, which is also formed as a layer and arranged on top of the layer 41 of the phase change material. According to this embodiment, the sensing structure 40 is directly arranged on the waveguide structure 42. Accordingly, there is no vacuum gap between the sensing structure 40 and the waveguide structure 42. The waveguide structure 42 comprises an optical resonator 45 comprising a plurality of holes 46.

As the phase change material 11 is directly coupled with the waveguide structure 42, there is a large thermal coupling of the phase change material 11 and the waveguide structure 42. As a result, the temperature change of the phase change material 11 under exposure of the radiation 17 is reduced. On the other hand, the direct coupling increases the overlap of the sensing radiation with the phase change material, thus increasing the optical sensitivity, which results in a larger optical contrast with respect to changes of the phase of the phase change material 11.

The optical resonator 45 increases the optical sensitivity of the radiation detector. Furthermore, the holes 46 of the optical resonator 45 increase the thermal decoupling of the sensing region to the wafer.

According to this embodiment, the waveguide structure 42 comprises a suspended region 47. The suspended region 47 comprises a void 47a below the waveguide structure 42. The void 47a improves the thermal insulation of the sensing structure 40. The void 47a is embedded in an insulating layer 48, e.g. an insulating layer of $SiO_2$. The insulating layer 48 is formed on a substrate 49. The substrate 49 may be e.g. a Si-substrate of a Si-wafer.

The radiation detector 400 may also use different wavelengths for the sensing signal 15 and the heating signal 21.

Figure 5:
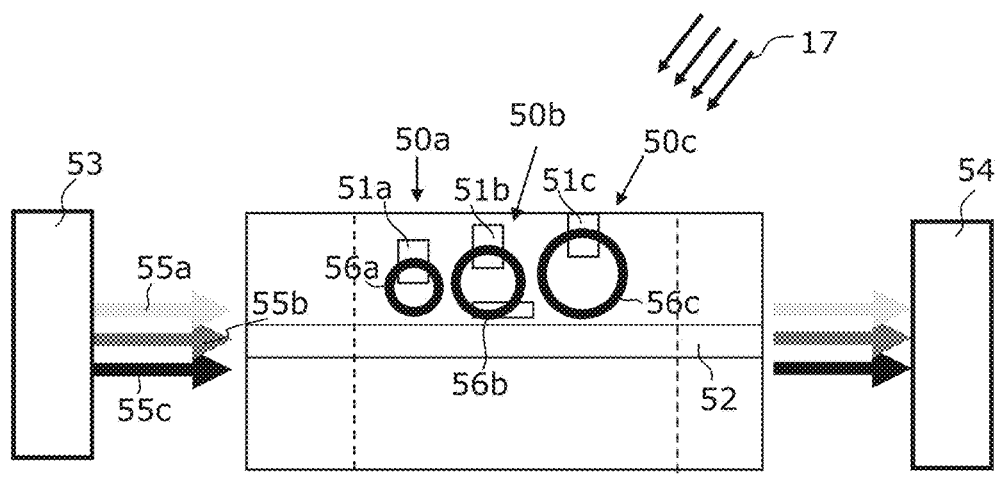
FIG. 5 shows a top view of a radiation detector according to another embodiment.

FIG. 5 shows a top view of a radiation detector 500 according to another embodiment.

The radiation detector 500 comprises a waveguide structure 52 and three sensing structures 50a, 50b and 50c. The sensing structure 50a comprises a segment 51a of a first phase change material, a segment 51b of a second phase change material and a segment 51c of a third phase change material. The phase change materials of the segments 51a, 51b and 51c have different transition temperatures. The different transition temperatures may be achieved e.g. by applying strain to the phase change material or by doping the phase change material or by changing geometrical parameters of the phase change material.

The sensing structure 50a comprises a resonator structure 56a, the sensing structure 50b comprises a resonator structure 56b and the sensing structure 50c comprises a resonator structure 56c. In this example, the resonator structures 56a, 56b and 56c are implemented as ring resonators. The resonator structure 56a is optically coupled to the segment 51a of the first phase change material, the resonator structure 56b is optically coupled to the segment 51b of the second phase change material and the resonator structure 56c is optically coupled to the segment 51c of the third phase change material. The resonator structures 56a, 56b and 56c have a different resonance wavelength. They can be arranged with posts or other connection structures (not shown) to the waveguide structure 52 or an underlying substrate/wafer (not shown). The radiation detector 500 may work without a heating device. The radiation detector 500 comprises a transmitter 53 that can transmit a plurality of sensing signals of a different wavelengths and an optical receiver 54 for receiving the plurality of sensing signals of the different wavelength. More particularly, the transmitter 53 is configured to transmit a first sensing signal 55a of a first sensing wavelength, a second sensing signal 55b of a second sensing wavelength and a third sensing signal 55c of a third sensing wavelength. The first sensing wavelength is adapted to sense a phase state transition of the first sensing structure 50a, the second sensing wavelength is adapted to sense a phase state transition of the second sensing structure 50b and the third sensing wavelength is adapted to sense a phase state transition of the third sensing structure 50c.

As mentioned above, the sensing structures 50a, 50b and 50c have different transition temperatures. The different transition temperatures are preferably chosen such that over a desired temperature operation range one of the sensing structures 50a, 50b and 50c is always close to its transition temperature. With such a design, the measurement range of the detector 500 can be tuned.

According to another embodiment, the transmitter 53 may emit broadband light and the receiver 53 may determine the spectrum of the transmitted light. From the spectral position/ and or the shape/extinction ratio of the resonances it is then possible to infer on the ring properties respectively the properties of the phase change material. This approach may also be used for a single sensing structure.

According to a further embodiment, the phase change material may be individually or globally heated by incident optical light.

Figure 6:
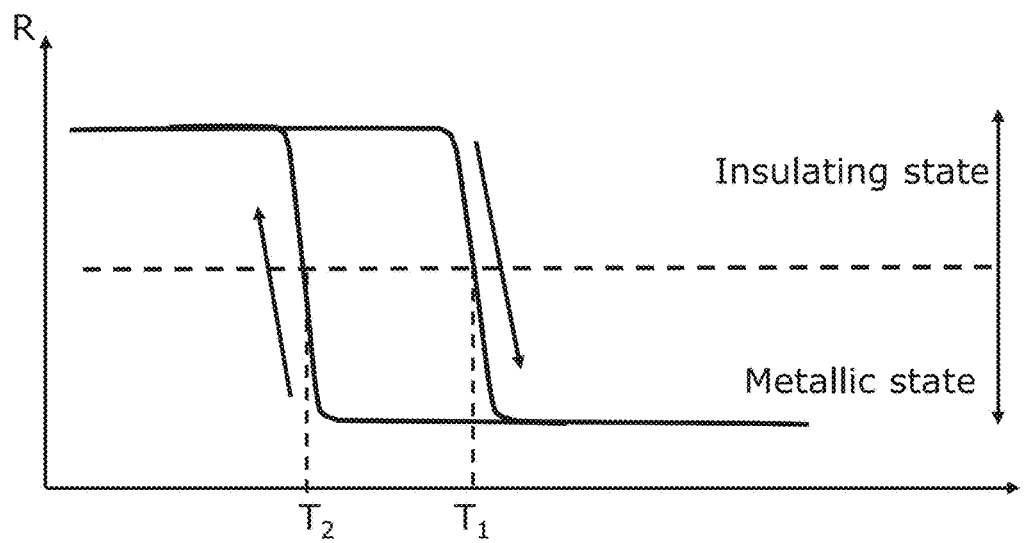
FIG. 6 illustrates in a schematic way an exemplary hysteresis-curve of a solid-state phase change material exhibiting a metallic-insulator phase transition.

FIG. 6 illustrates in a schematic way an exemplary hysteresis-curve of a phase change material exhibiting a metallic-insulator phase transition.

The horizontal axis represents the material temperature T of the phase change material and the vertical axis the resistance R of the phase change material.

Starting from the insulating state, the phase change material transitions from the insulating state to the metallic state at a first transition temperature $T_1$. In the other direction, the phase change material transitions from the metallic state to the insulating state at a second transition temperature $T_2$. The second transition temperature $T_2$ is lower than the first transition temperature $T_1$. In a first temperature range below $T_2$, the phase change material is in an insulating state. In a second temperature range above $T_1$, the phase change material is in a metallic state.

Figure 7:
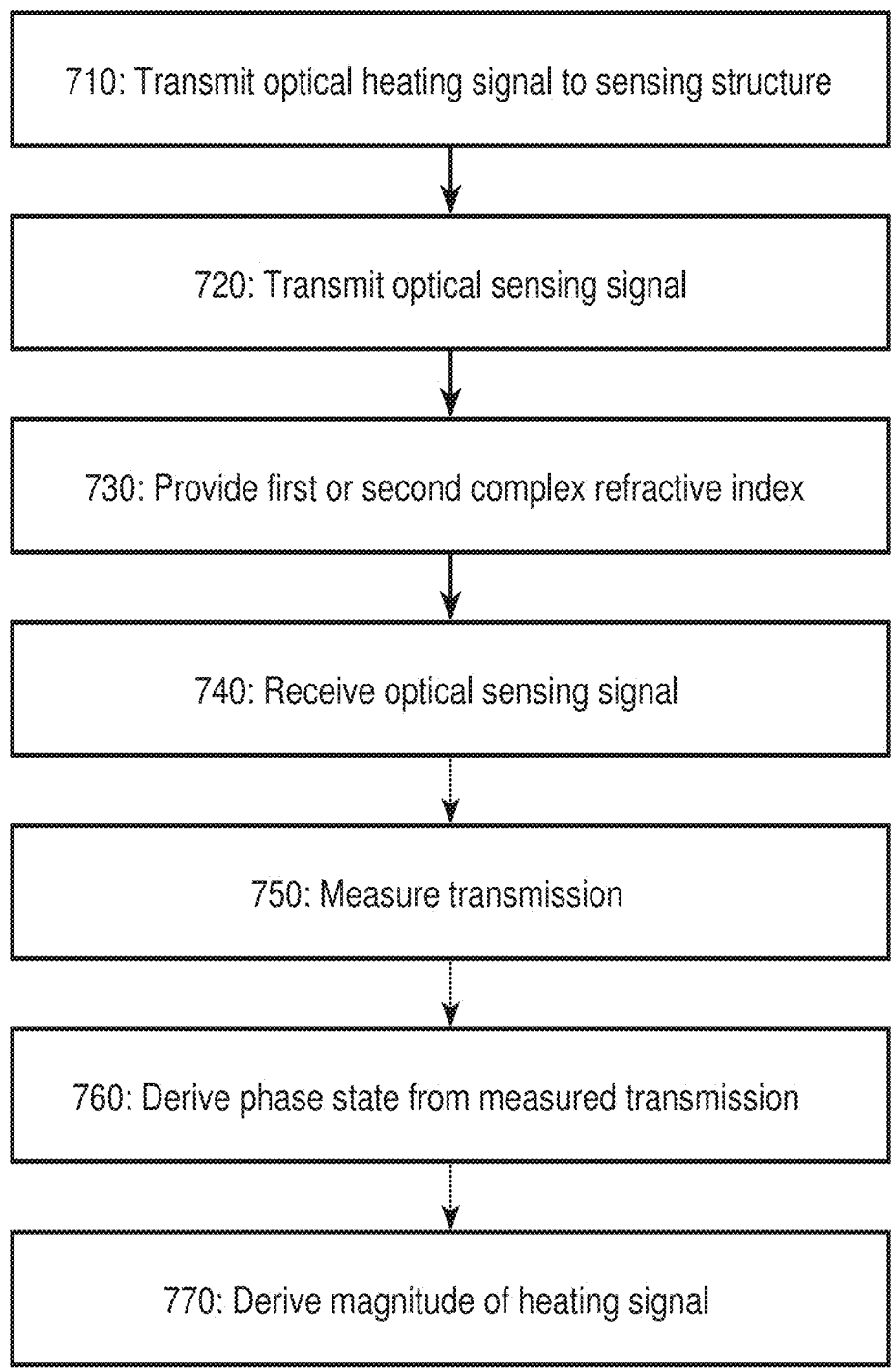
FIG. 7 illustrates method steps of a method for detecting radiation by a radiation detector.

FIG. 7 illustrates method steps of a method for detecting radiation by a radiation detector, e.g. by the radiation detector 100 as described with reference to FIG. 2.

At a step 710, the heating device 20 transmits an optical heating signal via the waveguide structure 12 to the sensing structure 10.

At step 720, the optical transmitter 13 transmits an optical sensing signal via the waveguide structure 12 to the optical receiver 14.

At a step 730, the phase change material 11 provides to the evanescent field of the optical sensing signal a first complex refractive index or a second complex refractive index in dependence on the respective phase state of the phase change material 11.

At a step 740, the optical receiver 14 receives the optical sensing signal from the transmitter 13.

At a step 750, the radiation detector 200 measures a transmission of the waveguide structure 12 for the sensing signal.

At a step 760, the radiation detector 200 derives the phase state of the phase change material 11 in dependence on the transmission of the waveguide structure 12 for the sensing signal.

At a step 770, the radiation detector 200 derives the magnitude of the heating signal.

In a further aspect, there is provided a computer program product for operating a radiation detector, e.g. the radiation detector 200 as described with reference to FIG. 2.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations o may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A radiation detector for detecting radiation, comprising
a waveguide structure;
a sensing structure comprising a phase change material;
an optical transmitter configured to transmit an optical sensing signal;
an optical receiver configured to receive the optical sensing signal from the transmitter via the waveguide structure;
wherein
the phase change material comprises as phase states a first phase state at a first temperature range and a second phase state at a second temperature range;
the phase change material is configured to transition from the first phase state to the second phase state under exposure of the radiation;
the sensing structure is arranged in an evanescent field area of the waveguide structure; and the sensing structure is configured to provide for an evanescent field of the optical sensing signal a first complex refractive index in the first phase state of the phase change material and a second complex refractive index in the second phase state of the phase-state material, the first complex refractive index being different from the second complex refractive index.

2. The radiation detector according to claim 1, wherein the detector is configured to
measure a transmission of the waveguide structure for the sensing signal; and
derive the phase state of the phase change material in dependence on the transmission of the waveguide structure for the sensing signal.

3. The radiation detector according to claim 1, wherein the first phase state is a state with a first electrical resistivity and the second phase state is state with a second electrical resistivity, wherein the first electrical resistivity is greater than the second electrical resistivity.

4. The radiation detector according to claim 1, wherein the sensing structure comprises an absorber to increase the absorption of the radiation by the sensing structure.

5. The radiation detector according to claim 1, comprising a heating device configured to apply an optical heating signal via the waveguide structure to the sensing structure.

6. The radiation detector according to claim 5, wherein a heating wavelength of the heating signal is different from a sensing wavelength of the sensing signal.

7. The radiation detector according to claim 5, wherein the sensing structure is arranged on a suspended structure that provides a vacuum gap between the sensing structure and the waveguide structure.

8. The radiation detector according to claim 7, wherein the detector is configured to apply the heating signal to the sensing structure via a near field coupling between the waveguide structure and the sensing structure.

9. The radiation detector according to claim 5, wherein the sensing structure is directly arranged on the waveguide structure.

10. The radiation detector according to claim 9, wherein the waveguide structure comprises an optical resonator comprising a plurality of holes.

11. The radiation detector according to claim 1, comprising a plurality of sensing structures, the plurality of sensing structures comprising different phase change materials having different transition temperatures.

12. The radiation detector according to claim 11, wherein each of the plurality of sensing structures comprises a resonator structure that is optically coupled to the phase change material of the respective sensing structure, wherein the resonator structures of the plurality of sensing structures have a different resonance wavelength.

13. The radiation detector according to claim 12, wherein the transmitter is configured to transmit a plurality of sensing signals, wherein the plurality of sensing signals has a different sensing wavelength adapted to sense a phase state transition of one of the plurality of sensing structures.

14. The radiation detector according to claim 1, wherein the phase change material is selected from the group consisting of $VO_2$, $V_4O_7$, $V_6O_{11}$, $V_2O_3$, $V_6O_{13}$, $V_5O_9$, $VO$, $V_8O_{15}$, $NbO_2$, $Ti_2O_3$, $LaCoO_3$, $Ti_3O_5$, $SmNiO_3$, $NdNiO_3$, $PrNiO_3$, $Fe_3O_4$, $Ge_2Sb_2Te_5$ and Ge—Sb—Te alloys.

15. The radiation detector according to claim 1, wherein the phase change material in the sensing element is strained in order to tune the phase change characteristics of the phase change material.

16. The radiation detector according to claim 1, wherein the phase change material is doped to tune the phase change characteristics of the phase change material.

17. The radiation detector according to claim 1, wherein the detector is configured to detect the radiation in the THZ range.

18. The radiation detector according to claim 1, wherein the detector is configured to detect the radiation in the IR range.

19. A method for detecting radiation by a radiation detector, the radiation detector comprising a waveguide structure and a sensing structure comprising a phase change material, the phase change material having a first phase state at a first temperature range and a second phase state at a second temperature range, the sensing structure being arranged in an evanescent field area of the waveguide structure; the method comprising:
transmitting, by an optical transmitter, an optical sensing signal via the waveguide structure to an optical receiver;
providing, by the phase change material, to the evanescent field of the optical sensing signal a first complex refractive index in the first phase state and a second complex refractive index in the second phase state, the first complex refractive index being different from the second complex refractive index;
receiving, by the optical receiver, the optical sensing signal from the transmitter;
measuring a transmission of the waveguide structure for the sensing signal; and
deriving the phase state of the phase change material in dependence on the transmission of the waveguide structure for the sensing signal.

20. A computer program product for operating a radiation detector having a waveguide structure, a sensing structure comprising a phase change material, an optical transmitter and optical receiver, said computer program product comprising a non-transitory computer readable storage medium having program instructions embodied therewith, the program instructions executable by the radiation detector to perform a method comprising:
transmitting, by the optical transmitter, an optical sensing signal via the waveguide structure to the optical receiver;
providing, by the phase change material, to the evanescent field of the optical sensing signal a first complex refractive index in the first phase state and a second complex refractive index in the second phase state, the first complex refractive index being different from the second complex refractive index;
receiving, by the optical receiver, the optical sensing signal from the transmitter;
measuring a transmission of the waveguide structure for the sensing signal; and
deriving the phase state of the phase change material in dependence on the transmission of the waveguide structure for the sensing signal.

* * * * *